(12) United States Patent
Rateick et al.

(10) Patent No.: US 10,197,178 B2
(45) Date of Patent: Feb. 5, 2019

(54) ELECTROHYDRAULIC VALVE INCLUDING A VIBRATION-RESISTANT, FLEXIBLE HERMETIC SEAL

(71) Applicant: HONEYWELL INTERNATIONAL INC., Morris Plains, NJ (US)

(72) Inventors: Richard Rateick, South Bend, IN (US); Donna Laboda, Niles, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/440,460

(22) Filed: Feb. 23, 2017

(65) Prior Publication Data

US 2017/0254432 A1 Sep. 7, 2017

Related U.S. Application Data

(60) Provisional application No. 62/304,419, filed on Mar. 7, 2016.

(51) Int. Cl.
*F16K 31/06* (2006.01)
*F16K 31/04* (2006.01)
(Continued)

(52) U.S. Cl.
CPC ........ *F16K 31/041* (2013.01); *F15B 13/0438* (2013.01); *F16J 15/52* (2013.01);
(Continued)

(58) Field of Classification Search
CPC ........ Y10T 137/2278; Y10T 137/8659; G05D 7/0635; F15B 5/003; F15B 13/0438;
(Continued)

(56) References Cited

U.S. PATENT DOCUMENTS 4,147,824 A 4/1979 Dettmann et al.
5,279,909 A 1/1994 Horner et al.
(Continued)

FOREIGN PATENT DOCUMENTS

EP 2562774 A1 2/2013
GB 534818 A 8/1939

OTHER PUBLICATIONS

Extended EP Search Report for Application No. 17158257.0-1556/3229244 dated Sep. 13, 2017.

*Primary Examiner* — Matthew W Jellett
(74) *Attorney, Agent, or Firm* — Lorenz & Kopf, LLP

(57) ABSTRACT

A vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and one or a plurality of convolutions between the first end and the second end, the first end disposed between and hermetically connected to the flapper and the armature, the second end disposed within the first opening and hermetically connected to the base, wherein the seal comprises: a non-porous metal that comprises a first fraction of the thickness; a porous metal comprising a plurality of pores that comprises a second fraction of the thickness; and an elastomeric material encompassed by the pores of the second fraction of the thickness, wherein the second fraction comprises one or both of the first and second outer surfaces of the seal.

14 Claims, 10 Drawing Sheets

(51) Int. Cl.
*F16J 15/52* (2006.01)
*F15B 13/043* (2006.01)
*H01F 7/128* (2006.01)
*H01F 7/14* (2006.01)

(52) U.S. Cl.
CPC ......... *F16K 31/0682* (2013.01); *H01F 7/128* (2013.01); *H01F 7/14* (2013.01)

(58) Field of Classification Search
CPC ... C25D 5/08; C25D 5/10; C25D 5/12; C25D 5/16; C25D 5/18
See application file for complete search history.

(56) References Cited

U.S. PATENT DOCUMENTS

| | | |
|---|---|---|
| 6,919,012 B1 | 7/2005 | Bucar |
| 7,726,340 B2 | 6/2010 | Druhan |
| 8,603,316 B2 | 12/2013 | Cohen |
| 2006/0283791 A1 | 12/2006 | Ross |
| 2009/0081444 A1 | 3/2009 | Kattannek et al. |
| 2013/0048891 A1 | 2/2013 | Druhan et al. |
| 2015/0276083 A1 | 10/2015 | Druhan et al. |
| 2015/0315716 A1* | 11/2015 | Whitaker ................ C25D 5/08 428/548 |

* cited by examiner

ELECTROHYDRAULIC VALVE INCLUDING A VIBRATION-RESISTANT, FLEXIBLE HERMETIC SEAL

CROSS-REFERENCE TO RELATED APPLICATION

The present application claims the benefit to U.S. provisional application Ser. No. 62/304,419, which was filed on Mar. 7, 2016.

TECHNICAL FIELD

The present disclosure generally relates to electrohydraulic servo valves and the torque motors used therein, and more particularly relates to an electrohydraulic servo valve that includes a vibration resistant, flexible hermetic seal.

BACKGROUND

Electrohydraulic servo valves (EHSVs) may be used in myriad systems and environments. One typical system and environment is the fuel control system on-board a jet-powered aircraft. No matter the specific end-use system and environment, EHSVs typically include a pair of nozzles that are coupled between a pressurized hydraulic fluid source and a hydraulically controlled load. Pressurized hydraulic fluid flow through each of the nozzles, and thus to the hydraulically controlled load, may be controlled via a torque motor.

A typical torque motor that is used with an EHSV includes a plurality of coils, an armature, and a flapper. The coils are controllably energized to control the rotational position of the armature. The flapper is coupled to the armature and extends between the outlets of each of the nozzles in the EHSV. By controlling the rotational position of the armature, the position of the flapper relative to each of the nozzle outlets is controlled, and thus fluid pressure and/or flow to the hydraulically controlled device is controlled.

The flapper in the above-described torque motor extends into the flow of hydraulic fluid. Thus, to protect the electrically energized portions of the torque motor from the hydraulic fluid, a suitable liquid-to-air seal is employed. Such seals, in the past, have typically been embodied as elastomeric packing, such as an O-ring. While these seals are generally safe, reliable, and robust, these seals may suffer certain drawbacks. For example, the use of an O-ring may limit both the lower and upper operational temperature limits for the EHSV. Further, the O-ring may also create hysteresis in valve operation, which may lead to a dead band and null shift.

Hence, there is a need for an improved seal for a torque motor that is used with an EHSV. In particular, there is a need for a seal that is able to operate in a wider range of temperatures, and is less susceptible to creating hysteresis in valve operation, as compared to presently known seals. It would also be beneficial to reduce assembly time of the EHSV. The present disclosure addresses at least these needs.

BRIEF SUMMARY

In one embodiment, disclosed is a vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and one or a plurality of convolutions between the first end and the second end, the first end disposed between and hermetically connected to the flapper and the armature, the second end disposed within the first opening and hermetically connected to the base, wherein the seal comprises: a non-porous metal that comprises a first fraction of the thickness; a porous metal comprising a plurality of pores that comprises a second fraction of the thickness; and an elastomeric material encompassed by the pores of the second fraction of the thickness, wherein the second fraction comprises one or both of the first and second outer surfaces of the seal.

In another embodiment, disclosed is a vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and a plurality of convolutions between the first end and the second end, the first end disposed between and hermetically connected to the flapper and the armature, the second end disposed within the first opening and hermetically connected to the base, wherein the seal comprises: a non-porous metal that comprises a first fraction of the thickness; a porous metal comprising a plurality of pores that comprises a second fraction of the thickness; and an elastomeric material encompassed by the pores of the second fraction of the thickness, wherein the first fraction comprises both of the first and second outer surfaces of the seal, and wherein the second fraction is disposed in between the first and second outer surfaces of the seal.

In yet another embodiment, A vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and a plurality of convolutions between the first end and the second end, the first end disposed between and hermetically connected to the flapper and the armature, the second end disposed within the first opening and hermetically connected to the base, wherein the seal comprises: a first metal alloy that comprises a first fraction of the thickness; and a second metal alloy, different from the first metal alloy, that comprises a second fraction of the thickness, wherein an alloy gradient of the first and second metal alloys exists between the first fraction and the second fraction.

Furthermore, other desirable features and characteristics of the torque motor and EHSV will become apparent from the subsequent detailed description and the appended claims, taken in conjunction with the accompanying drawings and the preceding background.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
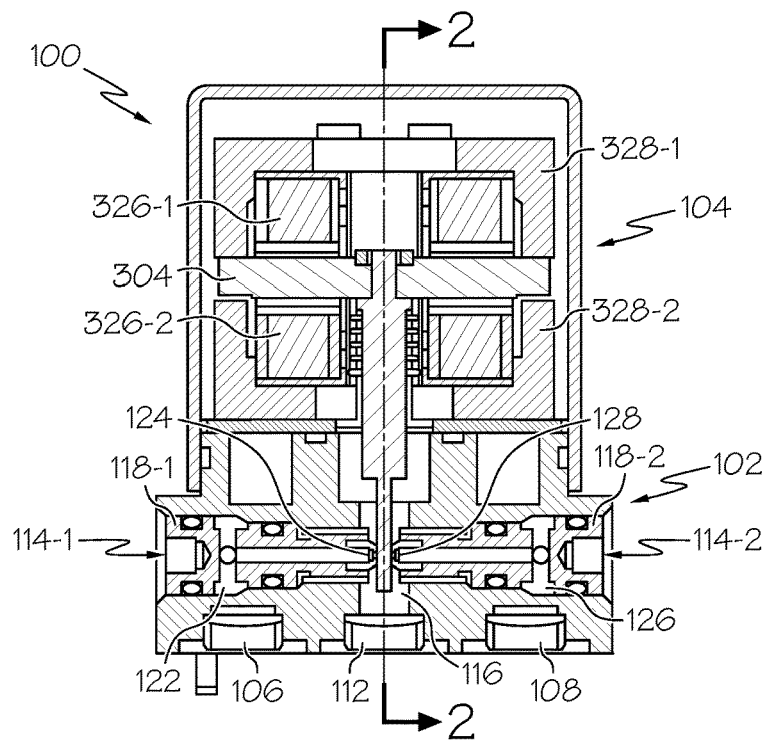
FIG. 1 is a cross section view of one exemplary embodiment of a electrohydraulic valve taken along line 1-1 in FIG. 2.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the claimed invention and not to limit the scope of the invention, which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Moreover, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The present disclosure primarily relates to vibration-resistant, flexible EHSV seals that can be employed in a wide variety of EHSVs. In particular, the disclosed seals may be categorized into one of three embodiments: the first embodiment includes a 100% dense layer of a metallic alloy and one or two porous layers of the alloy, wherein at least one of the porous layers includes an outer surface of the seal, and wherein the porous layer is infiltrated with an elastomeric material to increase damping; the second embodiment includes a porous layer of the alloy disposed in between two 100% dense layers of the alloy, again, the porous layer being infiltrated with an elastomeric material for increased damping; the third embodiment provides an alloy gradient across the thickness of the seal, in order to shift the elastic modulus of the of the seal material and thus the natural frequency thereof. For purposes of illustration, several exemplary embodiments of EHSV assemblies are disclosed below in connection with the inventive seals described herein. Namely, a first embodiment is provided in connection with FIGS. 1-8, and alternative embodiments are provided in connection with FIGS. 15-17. However, it should be appreciated that the seals may be used in connection with any configuration of EHSV (either now known in the art, or as may be manufactured in the future) to replace a conventional O-ring seal. Thus, the particular, exemplary EHSV assembly configurations illustrated in FIGS. 1-8 and in FIGS. 15-17 should be understood as merely providing an example of several possible uses of the seals, without being understood as limiting in any sense.

Figure 2:
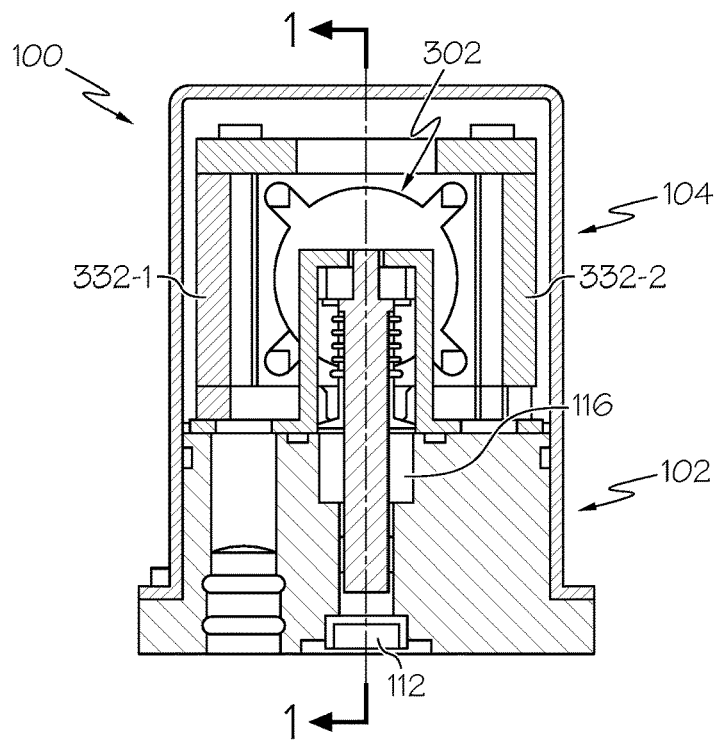
FIG. 2 is a cross section view of the electrohydraulic valve of FIG. 1 taken along line 2-2 in FIG. 1.
Figure 3:
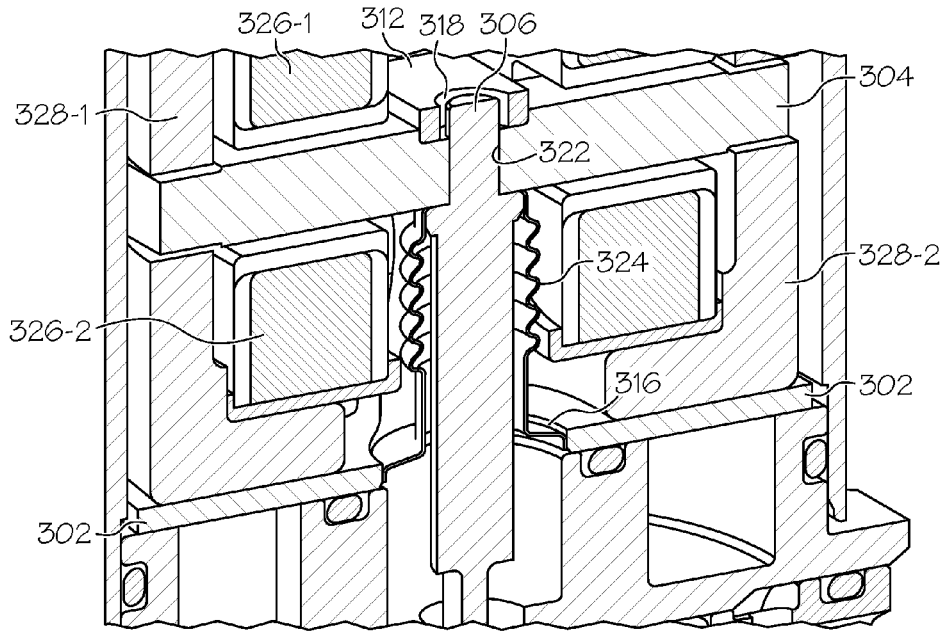
FIGS. 3 and 4 are close-up, cross section plan views of portions of the electrohydraulic valve depicted in FIGS. 1 and 2, depicting portions of the torque motor in more detail.

Referring now to FIGS. 1 and 2, different cross section views of one embodiment of an electrohydraulic servo valve (EHSV) 100 are depicted. The depicted EHSV includes a housing 102 and a torque motor 104. The housing 102 includes a first housing inlet 106, a second housing inlet 108, and a housing outlet 112. The first housing inlet 106 and the second housing inlet 108 are each adapted to be coupled in fluid communication with a pressurized fluid source (not illustrated). It will be appreciated that the pressurized fluid medium may vary, and may be any one of numerous gaseous or liquid media. The housing outlet 112 is adapted to be coupled in fluid communication with a pressurized fluid load, such as, for example, a pneumatic or hydraulic valve.

The housing 102 additionally includes two nozzle cavities—a first nozzle cavity 114-1 and a second nozzle cavity 114-2—and a flapper plenum 116. The first nozzle cavity 114-1 is in fluid communication with the first housing inlet 106 and the flapper plenum 116, and the second nozzle cavity 114-2 is in fluid communication with the second housing inlet 108 and the flapper plenum 116. The flapper plenum 116, which is disposed perpendicular to the first and second nozzle cavities 114-1, 114-2, is in fluid communication with the housing outlet 112.

Two nozzles 118, which are referred to herein as a first nozzle 118-1 and a second nozzle 118-2, are mounted within the housing 106. More specifically, the first nozzle 118-1 is mounted within the first nozzle cavity 114-1, and the second nozzle 118-2 is mounted within the second nozzle cavity 114-2. The first nozzle 118-1 includes a first nozzle inlet 122 and a first nozzle outlet 124, and the second nozzle 118-2 includes a second nozzle inlet 126 and a second nozzle outlet 128. The first nozzle 118-1 is configured such that the first nozzle inlet 122 is in fluid communication with the first housing inlet 106, and the first nozzle outlet 124 is disposed within the flapper plenum 116. The second nozzle 118-2 is configured such that the second nozzle inlet 126 is in fluid communication with the second housing inlet 108, and the second nozzle outlet 128 is disposed within the flapper plenum 116. As will be described momentarily, fluid flow through the first and second nozzles 118-1, 118-2, into the flapper plenum 116, and out the housing outlet 112 is controlled via the torque motor 104, an embodiment of which will now be described.

The torque motor 104 is coupled to the housing 102 and is adapted to be selectively energized. The torque motor 104 is configured, upon being selectively energized, to selectively place the housing outlet 112 in fluid communication with either or both of the first nozzle outlet 124 and the second nozzle outlet 128. In the depicted embodiment, and as shown more clearly in FIGS. 3 and 4, the torque motor 104 includes an armature support 302, an armature 304, and a flapper 306. The armature support 302, which is depicted apart from the EHSV 100 in FIGS. 5 and 6, includes a base 308, an armature-flapper support 312, and a plurality of springs 314. The base 308 has a first flapper opening 316 formed therein, and the armature-flapper support 312, which is spaced apart from the base 308, has a second flapper opening 318 formed therein. The springs 314, which in the depicted embodiment include a first spring 314-1 and a second spring 314-2, are coupled between the base 308 and the armature-flapper support 312. Although the springs 314 may be variously implemented, in the depicted embodiment the springs 314 are implemented using beam springs.

The armature 304 is coupled to the armature-flapper support 314 and has a third flapper opening 322 formed therein. Although the armature 304 may be variously configured, in the depicted embodiment, and as shown most clearly in FIG. 6, the armature 304 includes a central portion 602, a first arm 604-1, and a second arm 604-2. The central portion 602 has the third flapper opening 322 formed therein, and the first and second arms 604-1, 604-2 extend from the central portion 602 in opposite directions, and are disposed perpendicular to the flapper 306. The armature 304 is preferably formed of any one of various magnetically permeable materials.

Returning now to FIGS. 3 and 4, the flapper 306 is coupled to the armature-flapper support 312 and to the armature 304. The flapper 306 extends at least partially into the second flapper opening 318. The flapper 306 also extends through the first and third flapper openings 316, 322, and into the flapper plenum 116 between the first and second nozzle outlets 124, 128 (see FIG. 1). To prevent fluid within the EHSV housing 102 from leaking past the flapper 306 and into other portions of the torque motor 104, the torque motor 104 also includes a seal 324, three embodiments of which are described further below in connection with FIGS. 9, 10, and 11. Before doing so, however, various other components of the torque motor 104 will be described.

Figure 4:
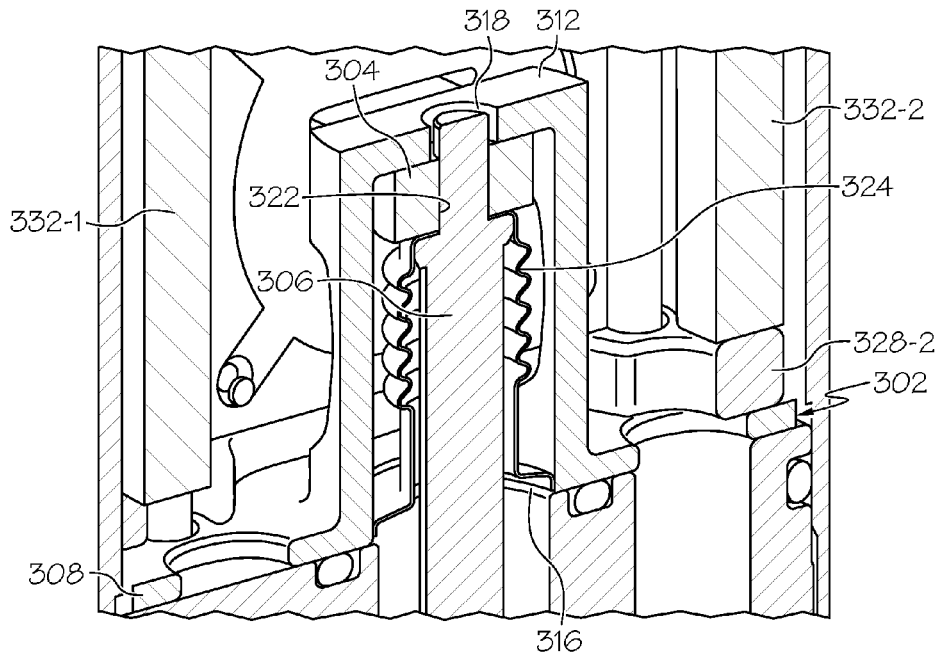

The depicted torque motor 104 additionally includes plurality of coils 326, a plurality of pole pieces 328, and a plurality of magnets 332 (see FIG. 4). The coils 326 (e.g., first coil 326-1 and second coil 326-2), the pole pieces 328 (e.g., first pole piece 328-1 and second pole piece 328-2), and the magnets 332 (e.g., first magnet 332-1 and second magnet 332-2) are all mounted on the armature support 302 in a well-known manner. When mounted, the first coil 326-1 surrounds a portion of the armature first arm 604-1, and the second coil 326-2 surrounds a portion of the armature second arm 604-2. The first pole piece 328-1 is disposed adjacent the first coil 326-1, and the second pole piece 328-2 is disposed adjacent the second coil 326-2. It will be appreciated that pole pieces 328, like the armature 304, are preferably formed of any one of numerous magnetically permeable materials.

The first magnet 332-1 is coupled between the first pole piece 328-1 and the second pole piece 328-2, and the second magnet 332-2 is spaced apart from the first magnet 332-1, and is also coupled between the first pole piece 328-1 and the second pole piece 328-2. The coils 326 are additionally configured to be coupled to a non-illustrated source of electrical current. As is generally known, the rotational position of the armature 304 can be controlled by controllably energizing the coils 326.

Figure 5:
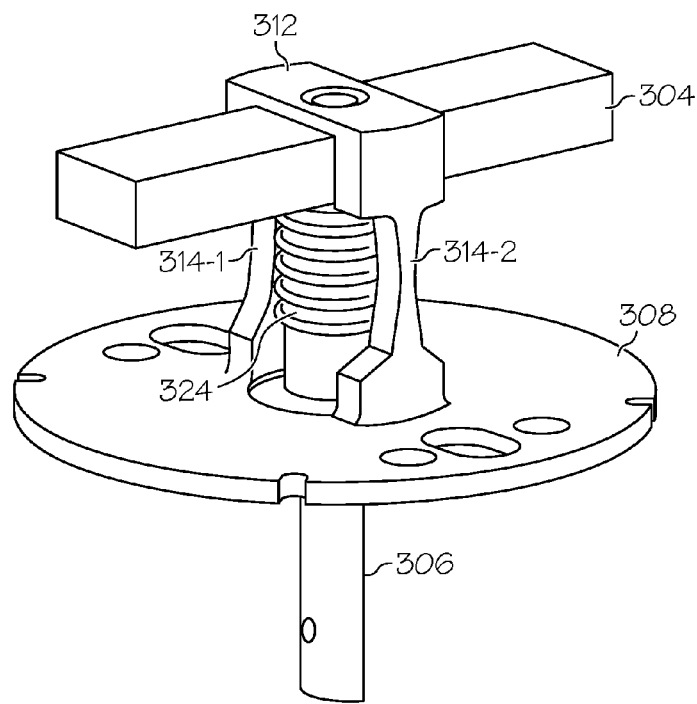
FIGS. 5 and 6 are plan and cross section views, respectively, of portions the torque motor assembly depicted in FIGS. 3 and 4.
Figure 6:
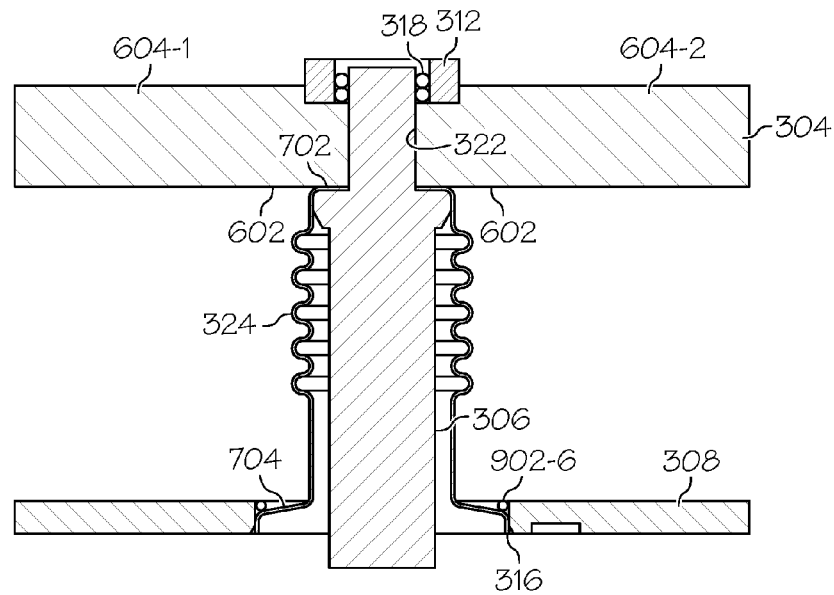
Figure 7:
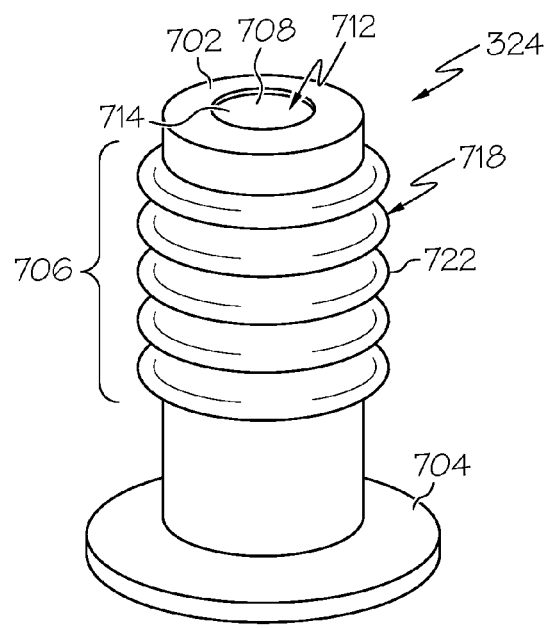
FIG. 7 is a plan view of a flexible metal seal that may be used to implement the electrohydraulic valve depicted in FIGS. 1 and 2.
Figure 8:
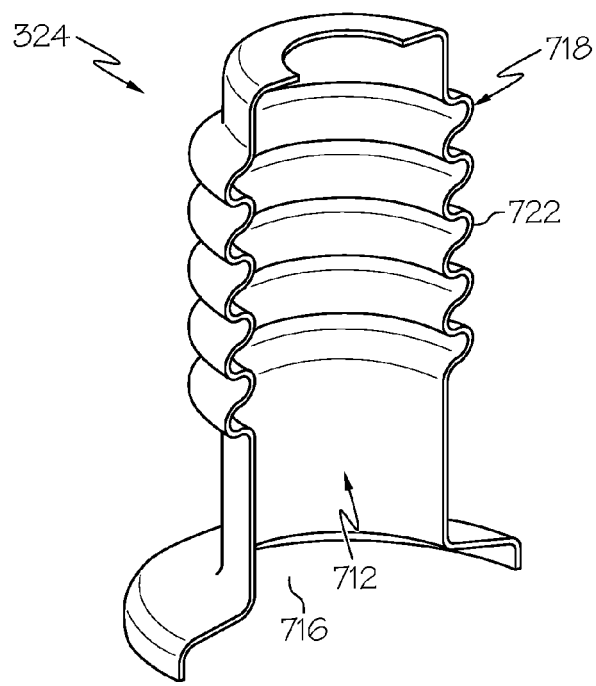
FIG. 8 is a partial cross section view of the flexible metal seal depicted in FIG. 7.

Referring now to FIGS. 7 and 8, an embodiment of the seal 324 is depicted and will now be described. It should be noted that the materials comprising the seal 324, across its thickness (for each of the three embodiments initially noted above), will be discussed in greater detail below in connections with FIGS. 9-11. The seal 324 is a flexible metallic seal and includes a first end 702, a second end 704, a central portion 706 disposed between the first and second ends 702, 704, and an inner surface 708 that defines a cavity 712 between the first and second ends 702, 704 and through the central portion 706. The first end 702 has a fourth flapper opening 714 formed therein, and the second end 704 has a fifth flapper opening 716 formed therein. A plurality of convolutions 718 are formed on the central portion 706 between the first and second ends 702, 704. As shown in FIGS. 5 and 6, the flapper 306 extends through the fourth and fifth flapper openings 714, 716, such that the seal 324 surrounds a portion of the flapper 306. The convolutions 718 in some embodiments may be circular, or another shape, and if circular, may have radiused turns 722 and, as shown most clearly in FIG. 8, have a substantially sine wave shape when viewed in vertical cross section. Although the number of convolutions 718 may vary, in the depicted embodiment the seal 324 includes five convolutions.

Returning back to FIG. 6, it may be seen that the first end 702 of the seal 324 is disposed between, and is connected to, both the armature 304 and the flapper 306. The second end 704 of the seal 324 is disposed within the first flapper opening 316 and is connected to the base 308. Most preferably, the first end 702 of the seal 324 is brazed to the armature 304 and the flapper 306, and the second end 704 of the seal 324 is brazed to the base 308. In alternative embodiments, instead of brazing, clamping may be employed.

Figure 11:
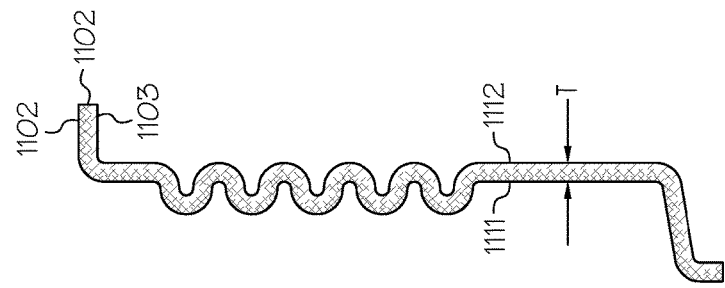
FIG. 11 is a cross section view of the flexible metal seal depicted in FIG. 7, showing a third embodiment of the thickness profile of the seal.
Figure 10:
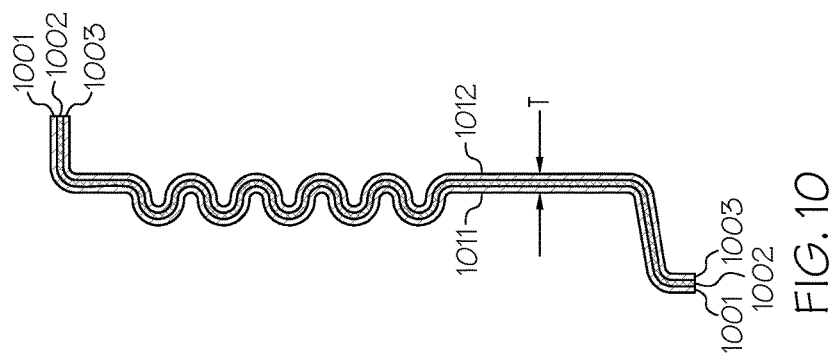
FIG. 10 is a cross section view of the flexible metal seal depicted in FIG. 7, showing a second embodiment of the thickness profile of the seal.
Figure 9:
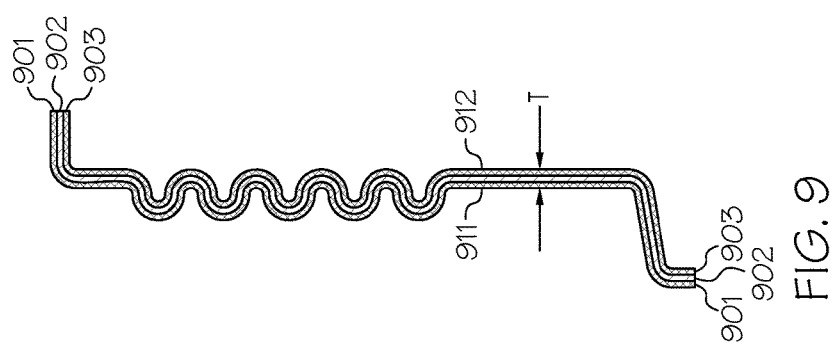
FIG. 9 is a cross section view of the flexible metal seal depicted in FIG. 7, showing a first embodiment of the thickness profile of the seal.

Attention will now be directed to FIGS. 9-11, which disclose various embodiments of a vibration-resistant, flexible metallic seal 324. First, with regard to FIG. 9, a metallic seal 324 is disclosed which has a thickness "t". The thickness "t" is defined between first and second outer surfaces 911 and 912. The thickness may be understood as generally including three portions or fractions. A first fraction 901 may include first outer surface 911, and inward for a distance. The second fraction 902 may include a middle portion of the thickness "t", but not either surface 911, 912. Further, a third fraction 903 may include second outer surface 912, an inward for a distance, with second fraction 902 being between the first and third fractions 901, 903. The seal 324 may comprise any one of numerous suitable metallic materials. In a particular embodiment, however, the seal 324 is formed from a high-strength nickel-cobalt alloy. One presently preferred nickel-cobalt alloy is available from Nicoform, Inc. of Rochester, N.Y., under the trade name NiColoy®, which comprises about 96% nickel and 4% cobalt.

The seal 324 illustrated in FIG. 9 may be made by electroforming. Electroforming is a standard process where the metal of interest is electroplated onto a conductive mandrel to build up the desired thickness. The mandrel has the shape of one surface of the part to be made. After electroplating, the mandrel material is removed commonly using an etching process. For the seal 324 illustrated in FIG. 9, after using a conventional electroforming process to build up a 100% dense layer, a combination of changing electrolyte composition and changing current density can produce a second layer with differing composition. This second layer would include a phase which would selectively be etched out at the conclusion of plating. The space left from removal of the etch phase would be replaced with an elastomer to increase damping. Thus, some fraction of the thickness is 100% dense metal and intrinsic to one or both free surface(s) 911, 912 of this metal form a porous layer which will bond to and partially encapsulate an elastomeric material to add damping. Accordingly, fractions 901 and 903 may be considered to be porous metal layers infiltrated with an elastomer, while fraction 902 may be considered to be a 100% dense (non-porous) metal layer.

Figure 12:
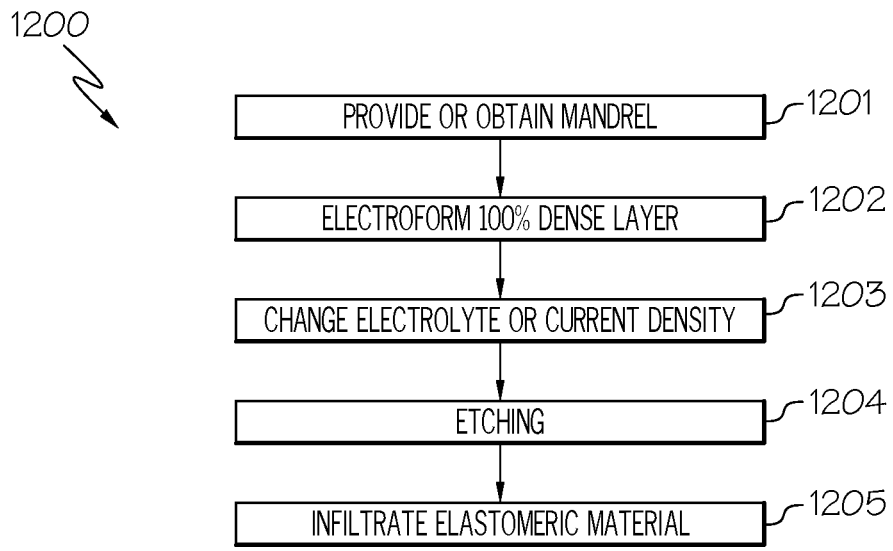
FIGS. 12, 13, and 14 are flowcharts illustrating methods for manufacturing flexible metal seals in accordance with the first, second, and third embodiments, respectively, shown in FIGS. 9, 10, and 11, respectively.

An exemplary process 1200 for manufacturing the seal 324 of FIG. 9 is shown in FIG. 12. At step 1201, a mandrel is obtained or provided that is in the shape of the seal 324 to be manufactured. At step 1202, electroforming is used to build a 100% dense (non-porous) layer on the mandrel. At step 1203, one or both of changing the electrolyte composition or changing the current density is employed to electroplate a layer of differing composition on the 100% dense layer, wherein the differing composition includes a phase that is susceptible to etching via the process employed to remove the mandrel. Thus at step 1204, chemical etching is performed to remove the mandrel, and at the same time, make the differing layer porous by etching the etch-susceptible phase. Finally, at step 1205, an elastomeric material is infiltrated into the porous layer.

Next, with regard to FIG. 10, a metallic seal 324 is disclosed which has a thickness "t". The thickness "t" is defined between first and second outer surfaces 1011 and 1012. The thickness may be understood as generally including three portions or fractions. A first fraction 1001 may include first outer surface 1011, and inward for a distance. The second fraction 1002 may include a middle portion of the thickness "t", but not either surface 1011, 1012. Further, a third fraction 1003 may include second outer surface 1012, and inward for a distance, with second fraction 1002 being between the first and third fractions 1001, 1003. The seal 324 may comprise any one of numerous suitable metallic materials, such as the aforementioned Ni—Co alloys.

The seal 324 illustrated in FIG. 10 may be made by electroforming. For the seal 324 illustrated in FIG. 10, the part would be made through the stage of creating a porous layer (as described above with regard to FIG. 9), and then the process would continue by reversing the process used to make the part porous, a second 100% dense layer would be applied to the top. The porous inner layer would then be selectively etched to open the pore structure for subsequent infiltration with an elastomer. Thus, in FIG. 10 a seal 324 is disclosed where the 100% dense metal encloses a porous layer which is subsequently infiltrated with elastomeric material to add damping. Accordingly, fractions 1001 and 1003 may be considered to be 100% dense layers, while fraction 1002 may be considered to be a porous layer that has been infiltrated with an elastomeric material.

Figure 13:
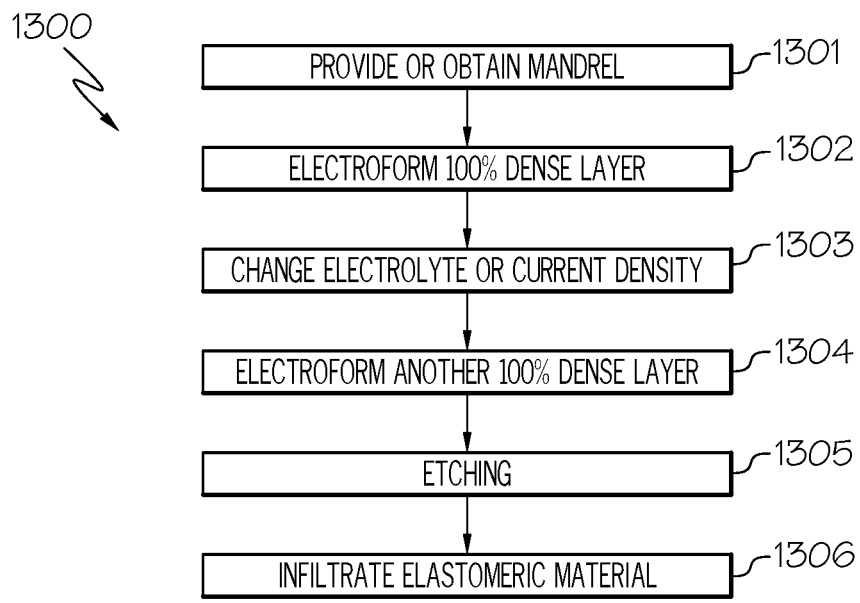

An exemplary process 1300 for manufacturing the seal 324 of FIG. 10 is shown in FIG. 13. At step 1301, a mandrel is obtained or provided that is in the shape of the seal 324 to be manufactured. At step 1302, electroforming is used to build a 100% dense (non-porous) layer on the mandrel. At step 1303, one or both of changing the electrolyte composition or changing the current density is employed to electroplate a layer of differing composition on the 100% dense layer, wherein the differing composition includes a phase that is susceptible to etching via the process employed to remove the mandrel. Thereafter, at step 1304, a further 100% dense layer is electroformed by reverting back to the original electrolyte composition and current density. Then at step 1305, chemical etching is performed to remove the mandrel, and at the same time, make the differing layer porous by etching the etch-susceptible phase. Finally, at step 1306, an elastomeric material is infiltrated into the porous layer.

Next, with regard to FIG. 11, a metallic seal 324 is disclosed which has a thickness "t". The thickness "t" is defined between first and second outer surfaces 1111 and 1112. The thickness may be understood as having a gradient in composition from outer surface 1111 through outer surface 1112. Thus, at surface 1111, the differential thickness 1102 including surface 1111 has a first metallic composition, and at surface 1112, the differential thickness 1103 including surface 1112 has a second metallic composition that is different from the first metallic composition. The remaining thickness 1101 in between surface differential thicknesses 1102, 1103 changes as a gradient from the first metallic composition to the second metallic composition. The seal 324 may comprise any one of numerous suitable metallic materials, such as the aforementioned Ni—Co alloys, and the gradient will have differing amounts of Nickel and Cobalt, and differing amounts of the various material phases formed therefrom.

The seal 324 illustrated in FIG. 11 may be made by electroforming. That is, for the seal 324 illustrated in FIG. 11, in multi-element concurrent plating processes, the current density applied to the part can change the composition. Thus, through a combination of varying total current and anode or auxiliary anode placement, the coating composition can be made to vary selectively throughout the part. This will shift the elastic modulus and thus the natural frequency. Accordingly, the disclosed seal 324 shown in FIG. 11 includes a seal where the alloy composition forms a gradient through the thickness 1101, thus changing the elastic modulus and shifting the natural frequency between the composition at differential thicknesses 1102, 1103.

Figure 14:
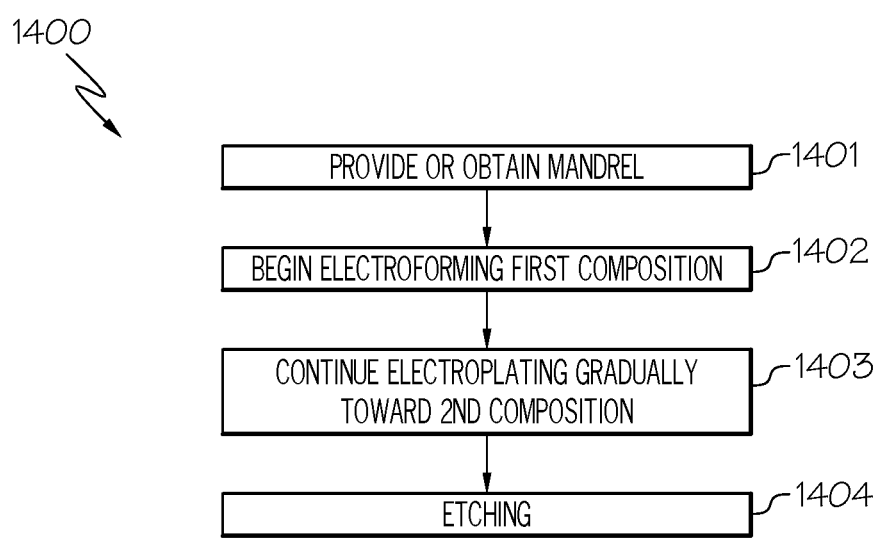

An exemplary process 1400 for manufacturing the seal 324 of FIG. 11 is shown in FIG. 14. At step 1401, a mandrel is obtained or provided that is in the shape of the seal 324 to be manufactured. At step 1402, electroforming is used to build an alloy layer having a first metallic composition on the mandrel. At step 1403, the electroforming process continues by gradually varying the current or electrolyte composition so as to form a composition gradient through the thickness that is electroplated, eventually ending the process at a second alloy composition. Then at step 1404, chemical etching is performed to remove the mandrel.

Figure 15:
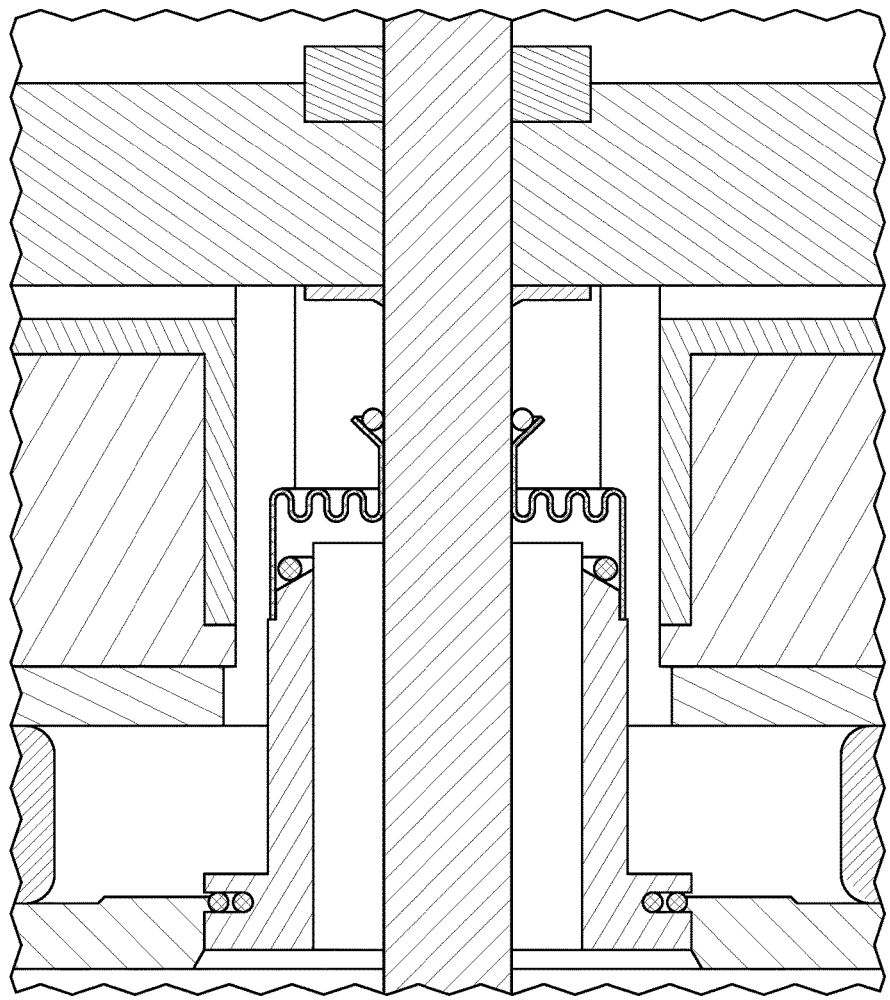
FIGS. 15, 16, and 17 are alternative embodiments of electrohydraulic valves that may incorporate a flexible metal seal according to the present disclosure.
Figure 16:
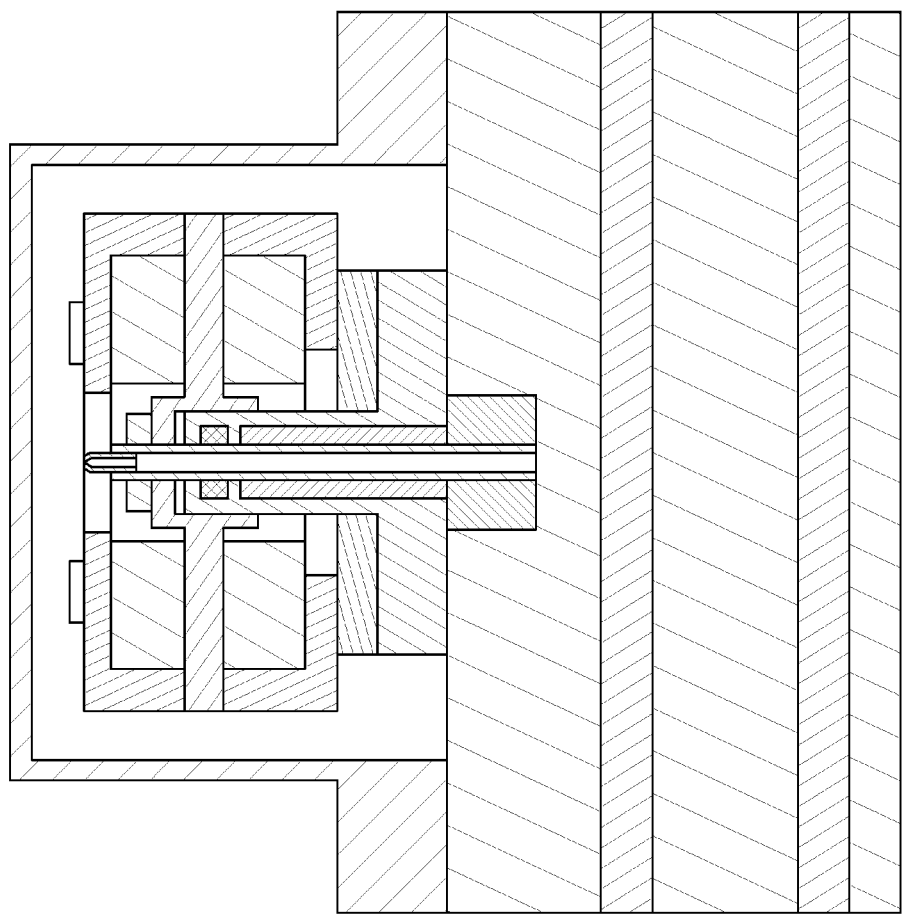
Figure 17:
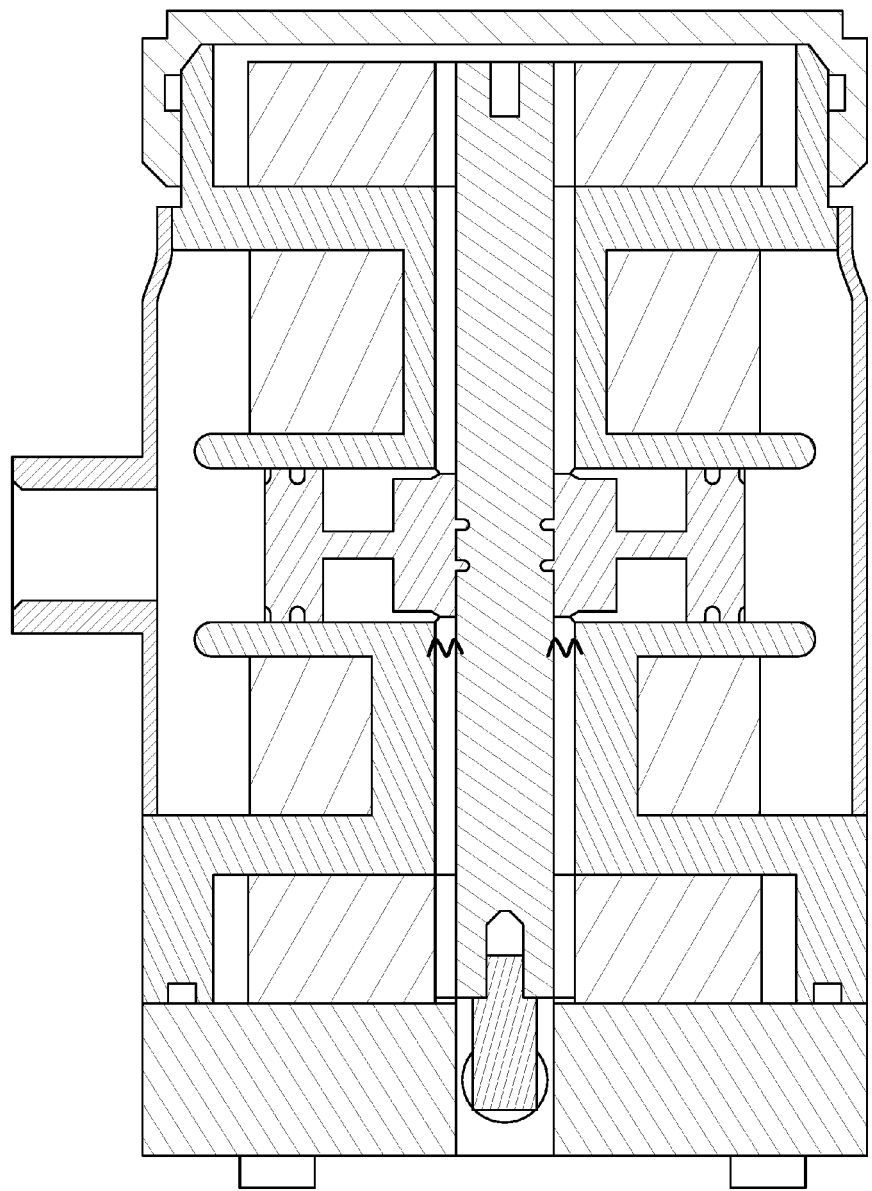

As previously noted, the above-described flexible metallic seal, and associated processes, may be implemented in connection with EHSV designs other than that presented in connection with FIGS. 1-8. Rather, it should be appreciated that the flexible metallic seal may be shaped and configured for various implementations. For example, FIGS. 15, 16, and 17 show three additional (non-limiting) implementations for the flexible metallic seal, which in each such drawing is labelled as "Hermetic Seal". First, with respect to FIG. 15, there is shown an embodiment wherein the metallic seal is connected to the flapper at one end and to a seal support to an the other end, with a radially-extending bellows portion in between. Second, with respect to FIG. 16, as opposed to a nozzle/flapper type design, the EHSV may be implemented with a jet pipe design, with the metallic seal surrounding a jet pipe. Further, with respect to FIG. 17, the position of the metallic seal may be modified so as to surround the armature. Of course, other configurations are equally possible, and will be appreciated by those having ordinary skill in the art.

Accordingly, the flexible metallic seal 324 described herein provides a leak-free barrier between fluid-containing portions and electrical portions of an EHSV 100. The flexible metal seal 324 is implemented using materials that metallurgically match surrounding structures, and reduces performance shifts that may occur due to changes in pressure, temperature, and excessive vibrational loads. The material and convoluted shape of the flexible metal seal 324 provide resistance to relatively high internal pressures while maintaining compliance in the direction of motion. In particular, the three embodiments of the seal 324 provide better resistance to vibration and fatigue than previous seal configurations known in the art, either with the use of an infiltrated elastomeric material or a gradient-profile metal material.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and one or a plurality of convolutions between the first end and the second end, the first end disposed between and hermetically connected to the flapper and the armature, the second end disposed within a first opening and hermetically connected to the base, wherein the seal comprises:
    a non-porous metal that comprises a first fraction of the thickness;
    a porous metal comprising a plurality of pores that comprises a second fraction of the thickness; and
    an elastomeric material encompassed by the plurality of pores of the second fraction of the thickness,
    wherein the second fraction comprises one or both of the first and second outer surfaces of the seal.

2. The vibration-resistant, flexible metallic seal of claim 1, wherein the non-porous metal comprises a first Ni—Co alloy.

3. The vibration-resistant, flexible metallic seal of claim 2, wherein the porous metal comprises a partially-etched, second Ni—Co alloy, the second Ni—Co alloy having a different phase composition as compared to the first Ni—Co alloy.

4. The vibration-resistant, flexible metallic seal of claim 1, wherein the elastomeric material is infiltrated into the plurality of pores of the second fraction.

5. The vibration-resistant, flexible metallic seal of claim 1, wherein the first end has a smaller diameter as compared to a diameter of the second end.

6. A torque motor, comprising:
    the armature support comprising the base, an armature-flapper support, and a plurality of springs, the base having the first opening, the armature-flapper support having a second opening, the base and armature-flapper support spaced apart from each other, the springs coupled between the base and the armature-flapper support;
    the armature coupled to the armature-flapper support and having a third opening;
    the flapper coupled to the flapper support and to the armature, the flapper extending through the first and third openings, and extending at least partially into the second opening; and
    the vibration-resistant, flexible metallic seal of claim 1.

7. An electrohydraulic valve, comprising:
    a nozzle housing including a first housing inlet, a second housing inlet, and a housing outlet;
    a first nozzle mounted within the nozzle housing, the first nozzle having a first nozzle inlet and a first nozzle outlet, the first nozzle inlet in fluid communication with the first housing inlet;
    a second nozzle mounted within the nozzle housings, the second nozzle having a second nozzle inlet and a second nozzle outlet, the second nozzle inlet in fluid communication with the second housing inlet; and
    the torque motor of claim 6.

8. A vibration-resistant, flexible metallic seal for use in an electrohydraulic servo valve (EHSV), the EHSV comprising an armature, an armature support comprising a base, and a flapper, the seal surrounding a portion of the flapper, the seal having a first end, a second end, a thickness along a length of the seal between the first end and the second end, the thickness being defined between first and second outer surfaces of the seal, and a plurality of convolutions between the first end and the second end, the first end disposed between and hermetically connected to the flapper and the armature, the second end disposed within a first opening and hermetically connected to the base, wherein the seal comprises:
    a non-porous metal that comprises a first fraction of the thickness;
    a porous metal comprising a plurality of pores that comprises a second fraction of the thickness, wherein the porous metal is formed by chemically etching an etch-suscpetible metal from a composite metal that comprises both the etch-susceptible metal and an etch-insuscpetible metal; and
    an elastomeric material encompassed by the plurality of pores of the second fraction of the thickness,
    wherein the first fraction comprises both of the first and second outer surfaces of the seal, and wherein the second fraction is disposed in between the first and second outer surfaces of the seal.

9. The vibration-resistant, flexible metallic seal of claim 8, wherein the non-porous metal comprises a first Ni—Co alloy.

10. The vibration-resistant, flexible metallic seal of claim 9, wherein the porous metal comprises a partially-etched, second Ni—Co alloy, the second Ni—Co alloy having a different phase composition as compared to the first Ni—Co alloy.

11. The vibration-resistant, flexible metallic seal of claim 8, wherein the elastomeric material is infiltrated into the plurality of pores of the second fraction.

12. The vibration-resistant, flexible metallic seal of claim 8, wherein the first end has a smaller diameter as compared to a diameter of the second end.

13. A torque motor, comprising:

the armature support comprising the base, an armature-flapper support, and a plurality of springs, the base having the first opening, the armature-flapper support having a second opening, the base and armature-flapper support spaced apart from each other, the springs coupled between the base and the armature-flapper support;

the armature coupled to the armature-flapper support and having a third opening;

the flapper coupled to the flapper support and to the armature, the flapper extending through the first and third openings, and extending at least partially into the second opening; and the vibration-resistant, flexible metallic seal of claim 8.

14. An electrohydraulic valve, comprising:

a nozzle housing including a first housing inlet, a second housing inlet, and a housing outlet;

a first nozzle mounted within the nozzle housing, the first nozzle having a first nozzle inlet and a first nozzle outlet, the first nozzle inlet in fluid communication with the first housing inlet;

a second nozzle mounted within the nozzle housings, the second nozzle having a second nozzle inlet and a second nozzle outlet, the second nozzle inlet in fluid communication with the second housing inlet; and the torque motor of claim 13.

* * * * *